United States Patent [19]

Levrai et al.

[11] Patent Number: 4,630,711

[45] Date of Patent: Dec. 23, 1986

[54] DEVICE FOR LUBRICATING A GEARTRAIN

[75] Inventors: Roland Levrai, Stains; Pierre Courbot, Villiers-le-Bel; Pascal Picot, Bonneuil-sur-Marne, all of France

[73] Assignee: Societe Anonyme D.B.A., Paris, France

[21] Appl. No.: 747,083

[22] Filed: Jun. 19, 1985

[30] Foreign Application Priority Data

Jun. 27, 1984 [FR] France .................. 84 10143
Apr. 10, 1985 [FR] France .................. 85 05377

[51] Int. Cl.⁴ ............... F01M 9/06; F01M 11/02; F16N 7/36
[52] U.S. Cl. ................... 184/6.12; 184/11.1; 184/11.2; 184/13.1
[58] Field of Search .......... 184/6.12, 11.1, 11.2, 184/11.3, 13.1; 74/467, 468

[56] References Cited

U.S. PATENT DOCUMENTS

| | | | |
|---|---|---|---|
| 1,019,645 | 3/1912 | Holdsworth | 184/11.2 |
| 1,099,916 | 6/1914 | Cushman | 184/11.2 |
| 1,435,574 | 11/1922 | Ackerman | 184/13.1 |
| 1,508,914 | 9/1924 | Belden | 184/11.1 |
| 1,554,081 | 9/1925 | Garrett | 74/467 |
| 1,608,413 | 11/1926 | Mortensen | 184/11.1 |
| 1,670,471 | 5/1928 | Merkt | 184/13.1 |
| 1,893,640 | 1/1933 | Ahlm | |
| 2,966,860 | 1/1961 | Maynard | 418/152 |
| 2,980,209 | 4/1961 | Rabson | 184/11 |
| 3,529,698 | 9/1970 | Nelson | 184/6 |
| 3,601,515 | 8/1971 | Pelizzoni | 184/6.12 |

FOREIGN PATENT DOCUMENTS

| | | |
|---|---|---|
| 612984 | 4/1935 | Fed. Rep. of Germany . |
| 2020198 | 7/1970 | France . |
| 82/01232 | 4/1982 | World Int. Prop. O. . |
| 681298 | 10/1952 | United Kingdom . |

Primary Examiner—Carlton R. Croyle
Assistant Examiner—Jane E. Obee
Attorney, Agent, or Firm—Larry J. Palguta; Ken C. Decker

[57] ABSTRACT

The lower part (11) of the chamber 8 of the geartrain (1, 3) has a profile substantially matching the peripheral outline of the lower gear, adjacent it, and forms a divider nose (12) connected flush to a discharge conduit (14) opening outwardly within an external container (16) the base of which communicates with the bottom part of the chamber (8) via an external conduit (22, 23, 25) including a restriction (26).

11 Claims, 3 Drawing Figures

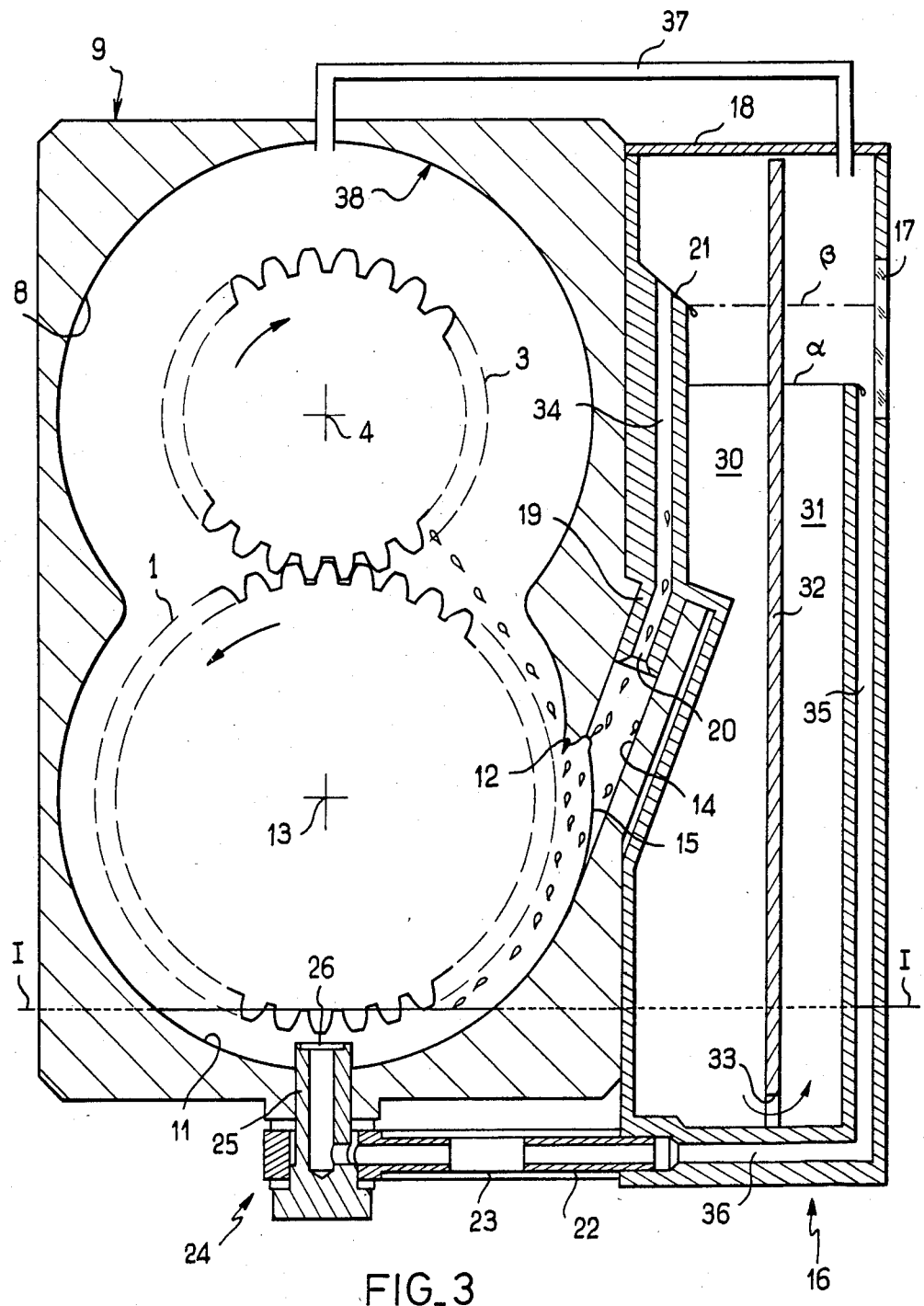
FIG_3

DEVICE FOR LUBRICATING A GEARTRAIN

The present invention relates to a device for lubricating a geartrain arranged in an internal chamber of a housing, the bottom part of which forms a storing area for storing a liquid lubricant for the geartrain and in which the bottom part of one of the gears is normally immersed.

It is known that, in particular in motor-vehicle transmissions or in reduction geartrains, co-operating gears are lubricated, during operation, by plunging or immersing the bottom part of one of the gears in the bottom of the housing which forms a storage area for the lubricant, the rotation of the gears causing part of the lubricant to be conveyed towards the other gear or gears co-operating with the plunger gear. When operation is interrupted, the lubricant thus dispersed flows back, by gravity, towards the storage area. In the case of gears operating at high speed, in view of the problems of losses resulting from friction and of overheating of the lubricant, a compromise solution must be adopted as regards the quantity of lubricant enclosed in the gear housing chamber so that the lubricant level in the base of the chamber is, during operation, as low as possible but is sufficient, when operation is interrupted, to ensure, subsequently, adequate lubrication of the gears. Such a compromise is extremely difficult to achieve in practice, the quantity of lubricant generally being dosed to be far in excess of that required, for reasons of safety.

One object of the present invention is to provide a device for lubricating a gear train, in a simple arrangement, of reduced manufacturing costs and easy to maintain, which overcomes the above mentioned drawbacks and enables, during operation of the gear train, an extremely low but sufficient level to be achieved in the base of the chamber and an efficient cooling of the lubricant withdrawn from the storage area in the chamber, while ensuring, when operation is interrupted, that there is a high enough lubricant level to guarantee adequate lubrication of the gears during operation.

To this end, according to a feature of the invention, the housing chamber has, at least locally, around said gear normally partially immersed in the lubricant accumulated in the bottom part of the chamber, a peripheral inner profile matching substantially the peripheral outline of said gear, adjacent the latter, and comprises, at a level higher than that of said bottom part forming said storage area of said chamber, a separating nose extending inwardly into said chamber and towards the periphery of said gear and connected to a discharge conduit which is formed in said housing and opens inwardly in said chamber in front of said nose relative to the direction of rotation of said gear and which communicates outwardly with a top part of a lubricant storage container located outside said housing and having a base portion communicating with said bottom part of said housing chamber via an external return conduit.

With such an arrangement, when the geartrain is set in motion, the bottom gear immersed in the excess lubricant in the bottom part of the chamber conveys, during rotation, a substantial part of this lubricant towards the other gears of the geartrain and towards the top part of the housing chamber, the nose and the discharge conduit diverting part of this conveyed lubricant towards the external storage container from where the lubricant, conveniently cooled, is able to reach again the bottom part of the chamber.

Another object of the present invention is to provide a lubricating device of the above class, which has a simple, low cost and modular structure.

To this end, according to another feature of the invention, the storage container is advantageously mounted in a detachable manner on the housing.

Still another object of the invention is to provide a container for such a lubrication device which permits to have a greater reserve of lubricant while maintaining control of a minimum but sufficient amount of lubricant in the housing chamber and to ensure an optimum cooling of the lubricant recirculated to the housing chamber.

Other features and advantages of the present invention will become apparent from the following description of embodiments given by way of illustration but in no way limiting, with reference to the attached drawings in which:

FIG. 3 is a view similar to FIG. 1 but showing another embodiment of the invention.

Figure 2:
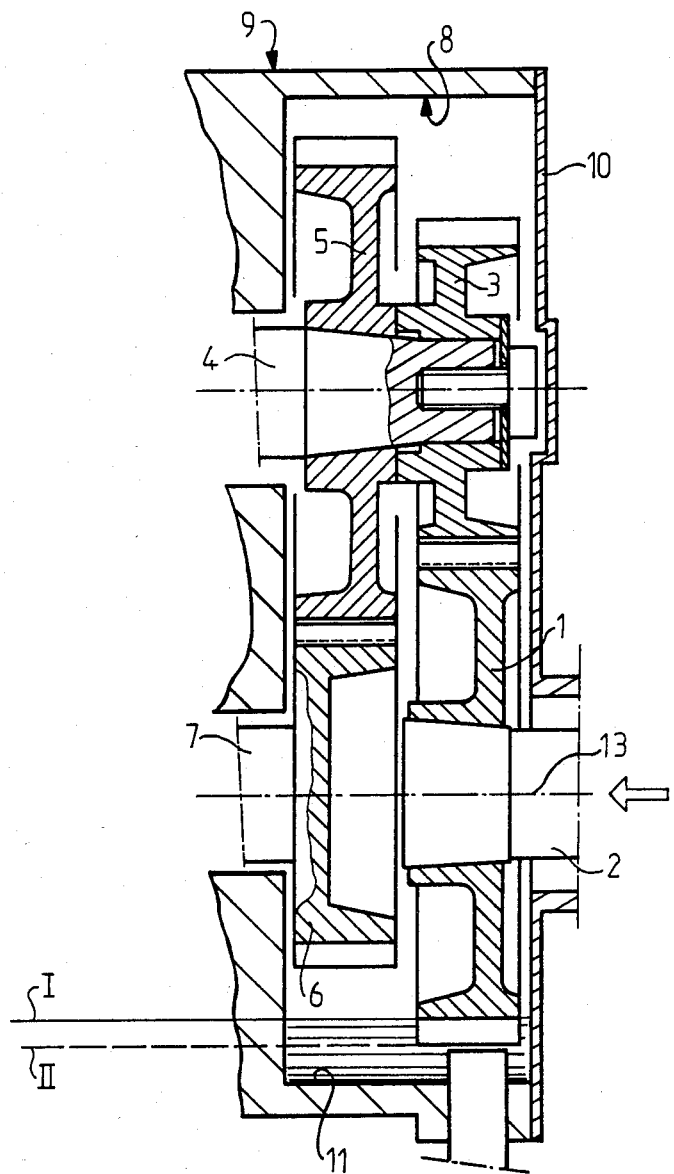
FIG. 2 is a partial, cross-sectional view, of a geartrain to use the lubricating device according to the invention.

FIG. 2 shows by way of a non-limiting example a speed-increasing geartrain comprising a toothed input wheel 1 driven by a drive shaft 2 and meshing with a pinion 3 mounted on a shaft 4 carrying, in addition, another toothed wheel 5 meshing with a pinion 6 integral with a shaft 7 coaxial with the input shaft 2 and parallel to the shaft 4. The gears 1, 3, 5 and 6 are arranged in an internal chamber 8 of a housing 9 closed by a cover 10. This geartrain is, for example, the train for driving and synchronizing a pair of rotors of a screw-type compressor such as described in the European Patent Application EP-A-0,101,345, the shaft 4 being the shaft of the female rotor and the shaft 7 being the shaft of the male rotor, this speed-increasing geartrain enabling the rotors to reach rotational speeds greater than 12,000 revolutions per minute.

Figure 1:
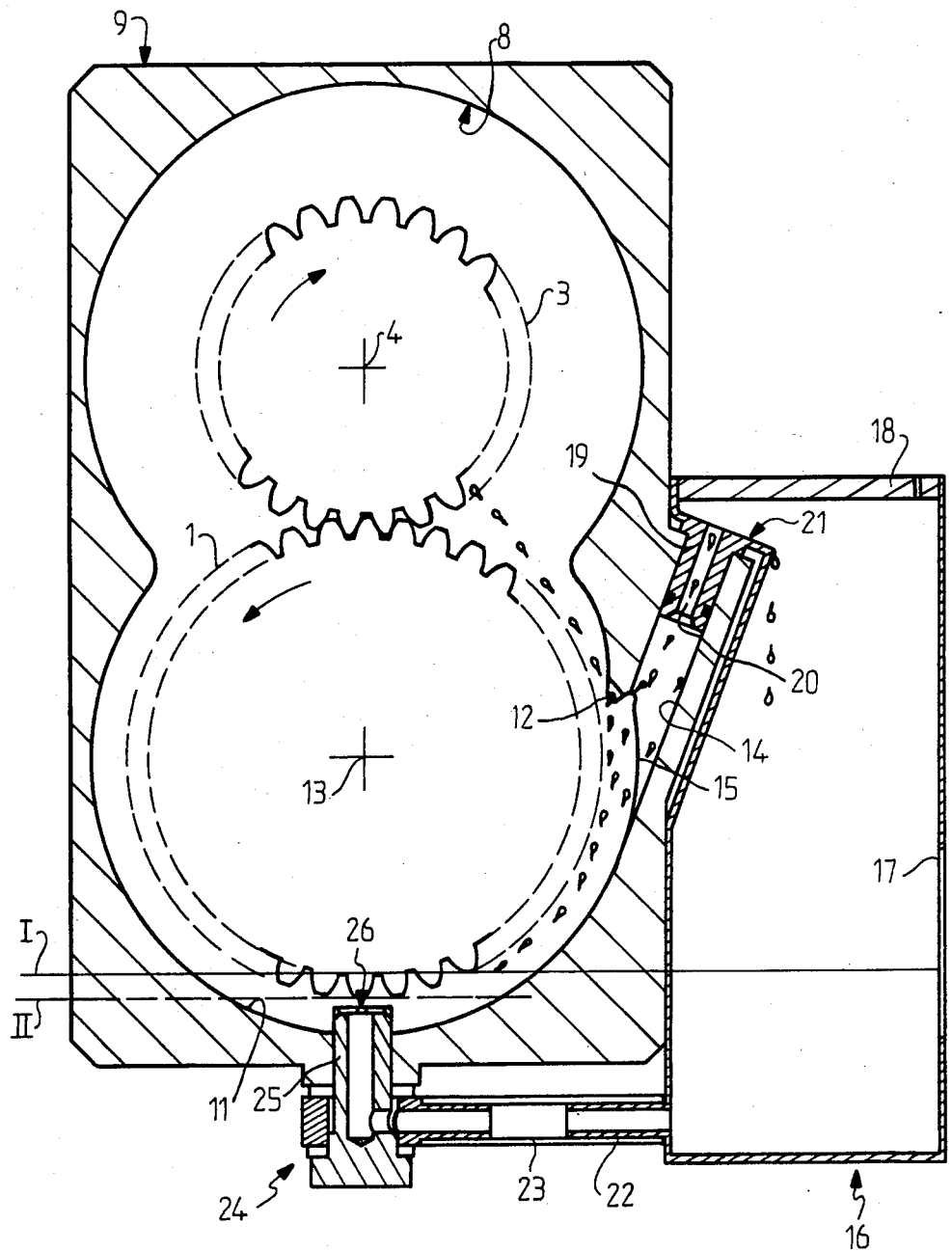
FIG. 1 is a diagrammatic, sectional view of a device for lubricating a geartrain according to the invention.

As can be seen more clearly in FIG. 1, the chamber 8, which has the general appearance of a figure 8, has a bottom part 11 with an internal peripheral profile matching substantially the peripheral outline of the toothed wheel 1, in the vicinity of the latter, over most of the peripheral extension of this toothed wheel 1. The wall of this bottom part 11 of the chamber 8 comprises, in its rising part, relative to the normal direction of rotation of the toothed wheel 1, a separating nose 12 projecting into the chamber 8 and extending downwards in a direction towards the periphery of the toothed wheel 1, close to the latter, the nose 12 being situated at a level above the axis 13 of the toothed wheel 1 and being joined in a continuous manner, by its bottom part, to a discharge conduit 14 formed in the wall of the housing 9 and opening inwardly in the bottom part 11 of the chamber 8 via an opening 15 having a vertical extension substantially centered on the level of the axis 13. As can be seen in FIG. 1, the discharge conduit 14 extends outwards and upwards from the opening 15 in a general direction substantially tangential to the internal periphery of the bottom part 11 of the chamber 8.

According to one aspect of the invention, the discharge conduit 14 opens outwardly in the upper part of a storage container 16 mounted externally on the housing 9 and made for instance of metal with, where appropriate, a lateral aperture 17 made of transparent material, the storage container being closed at the top by a cover 18. A tubular connecting piece 19 is mounted in a leak-tight manner in the top end of the discharge conduit 14 and has, running through it, an internal passage 20 having a cross section less than that of the conduit 14 and thereby forming a collecting neck inside the latter. The connecting piece 19, which is advantageously integral with the storage container 16 and serves for mounting it onto the housing 9, terminates inside the container 16 in an inclined downwardly extending surface 21. The storage container 16 has, at its base, a fitting 22 for connection, via a tube 23, to an elbow fitting 24 mounted in the bottom of the housing 9 and comprising a tubular part 25 passing vertically through the bottom wall of the housing 9 so as to project slightly into the bottom part 11 of the chamber 8, relative to the lowest level of the latter, and thus emerging in the immediate vicinity of the lowest peripheral part of the toothed wheel 1. According to one aspect of the invention, the return circuit 22-23-25 comprises a constriction 26 which has a flow cross-section less than that of the necked passage 20 and advantageously consists of a diaphragm crimped onto the outer end of the tubular part 25.

Operation of the lubricating device is as follows. During a period of inactivity, the lubricant in the chamber 8 and in the storage tank 16 is at the level indicated by the line I, that is to say that the teeth on the bottom part of the toothed wheel 1 are completely immersed in the quantity of lubricant in the base of the bottom part 11 of the chamber 8. During operation, when the toothed wheel 1 rotates, it conveys upwards, as indicated by the droplets, most of the lubricant initially stored in the base of the bottom part 11 of the chamber 8. The lubricant thus conveyed is brought up to the level of the opening 15 and the separating nose 12 so that only a part of the conveyed lubricant not adhering to the toothed wheel 1 reaches the top part of the chamber 8 in order to lubricate the gears 3, 5 and 6, the remainder of the conveyed lubricant being transported dynamically together with the air also diverted into the discharge pipe 14 and the constricted passage 20 of the connecting piece 19 which slows down the diverted droplets; the latter accumulate, after emerging from the passage 20, on the inclined surface 21 of the connecting piece 19, from where they slowly flow, by gravity, downwards into the storage container 16. The lubricant level in the bottom part 11 of the chamber 8, during operation of the geartrain, is indicated by the line II which is substantially tangential to the ends of the teeth on the toothed wheel 1. As a result of the constriction 26, when the assembly is subjected to jerks or to sudden increases in speed, in particular when it is mounted in a motor-vehicle, the quantity of lubricant within the storage container 16 is prevented from being suddenly transferred into the bottom part 11 of the chamber 8, thus allowing the normal operating level II to be substantially maintained. The bearings of the shafts 2, 4 and 7 of the gear train pinions are also lubricated by the splashes of lubricant and by the emulsion created in the housing 9 when the toothed wheel 1 rotates.

In addition, the structure described above enables convenient cooling of the lubricant recirculated into the chamber 8, the flow cross-section of the constriction 26 consequently being adapted owing to the variations in viscosity of the lubricant as a function of the temperature.

In the embodiment illustrated in FIG. 3, the container 16 has a generally elongated upwardly extending configuration and defines a generally vertical accumulation inner volume divided into adjacent vertical first and second chambers 30, 31, respectively, by a vertical partition wall 32 which extends substantially all over the internal height of the container. The partition wall 32 is formed, at its lower part, with a through orifice 33 which normally forms the sole fluid flow communication between the two chambers 30 and 31. The discharge passage 20 is prolongated, beyond the connecting piece 19, by an upwardly extending passage 34, which is advantageously formed in the wall out of a heat-resisting plastic material of the container 16, which opens upwardly, by the inclined surface 21, into the upper part of adjacent first chamber 30. On or within the opposite side wall of the container 16 there is formed a downwardly extending feeding conduit including a main vertical portion 35 and a lower portion formed on or within the bottom of the reservoir and terminated by the fitting 22 for connection to the return line 23, 24. Conduit portion 35 opens upwardly in the upper part of the second chamber 31 at a level $\alpha$ lower than the level where passage 34 opens into the inclined surface 21.

For operation of the lubricating device, the reservoir 16 is filled with a quantity of lubricant greater than the quantity for filling normally the accumulation volume in chambers 30, 31, as depicted by level line $\alpha$. The quantity of lubricant in excess, depicted in FIG. 3 by the volume between the level lines $\alpha$ and $\beta$, flows through the feeding conduit 35, 36 into the base part 11 of the gear chamber 8 to thereby reach in said chamber the level I, the lubricant in the chambers 30, 31 having then a level coinciding with level $\alpha$. In operation, when the toothed wheel 1 rotates, it conveys upwardly, as depicted by the droplets, a substantial part of the lubricant previously stored in the bottom part 11 of the chamber 8. As above described, the part of the lubricant forcingly conveyed through the passages 20 and 34 drops into the upper part of the first chamber 30, whereby causing the lubricant at the ambient temperature accumulated in upper part of the second chamber 31 to overflow into the return conduit 35, thereby refeeding same and re-admitting a quantity of cooled lubricant in the bottom part 11 of the gear chamber 8. The lower level of lubricant in the bottom part 11 is thus kept substantially constant. In this recirculation process, the lubricant flow from the first chamber 30 into the second chamber 31 occurs only through the orifice 33, whereby the heated lubricant emerging from the passage 34 cannot reach the feeding circuit 35, and is prevented from being direct or rapidly recirculated into the gear chamber.

The external wall of the reservoir 16 has a window 17 of a transparent material, typically also a plastic material, and there is advantageously provided an outer pressure equalizing duct 37 between the upper part of the second chamber 31 in the container 16 and the upper part 38 of the gear chamber 8 to prevent any depressurization in the latter. A similar equalizing duct may also be provided between the housing 9 and the cover 18 in the embodiment of FIG. 1.

Although the present invention has been described in relation to particular embodiments, it is not limited by the latter, but on the contrary is open to modifications and variations by a person skilled in the art.

We claim:

1. A device for lubricating a geartrain arranged in an internal chamber of a housing, said chamber having a bottom part which forms a storing area for storing a lubricant for the gear train and in which a bottom part of one of the gears rotating around an axis is normally immersed, characterized in that the chamber has, at least locally around the one gear, a peripheral inner profile matching substantially the peripheral outline of said one gear, adjacent the latter, and comprises, at a level higher than that of said bottom part of said chamber, a separating nose extending inwardly into said chamber and toward the periphery of said one gear and connected to a discharge conduit which is formed in said housing and opens inwardly in said chamber in front of said nose relative to a direction of rotation of said one gear, the discharge conduit communicating outwardly with a top part of a lubricant storage container located outside said housing and having a base portion communicating with said bottom part of said chamber via an external return conduit, said storage container defining a generally vertical inner accumulation volume divided, by a partition wall, into first and second chambers intercommunicating via a passage formed in a lower part of said partition wall, said discharge conduit opening outwardly, at a first level, in an upper part of said first chamber, and the storage container further comprising a feeding conduit having a lower portion communicating with said bottom part of said internal chamber and opening upwardly at a second level into an upper part of said second chamber.

2. The device according to claim 1, wherein said second level is lower than said first level.

3. The device according to claim 1, further comprising a conduit connecting said upper part of said second chamber of said container to an upper part of said internal chamber.

4. The device according to claim 1, wherein said container is made out of plastic material.

5. The device according to claim 1, wherein said storage container is mounted in a detachable manner on said housing.

6. The device according to claim 1, wherein said return conduit emerges into said bottom part of said internal chamber via an end part which projects into said internal chamber relative to the inner profile of the internal chamber.

7. The device according to claim 6, wherein said return conduit includes a restriction.

8. The device according to claim 1, wherein said nose is situated at a higher level than that of said axis of said one gear.

9. The device according to claim 8, wherein said discharge conduit extends upwards and substantially tangentially from said inner profile of said internal chamber.

10. The device according to claim 8, wherein said discharge conduit comprises a constriction.

11. The device according to claim 10, wherein said constriction is formed by a connecting piece which is integral with said storage container and engaged in said discharge conduit.

* * * * *